July 10, 1928. 1,676,344
J. NEWMANN
HOISTING APPARATUS
Filed Aug. 17, 1926    3 Sheets-Sheet 1
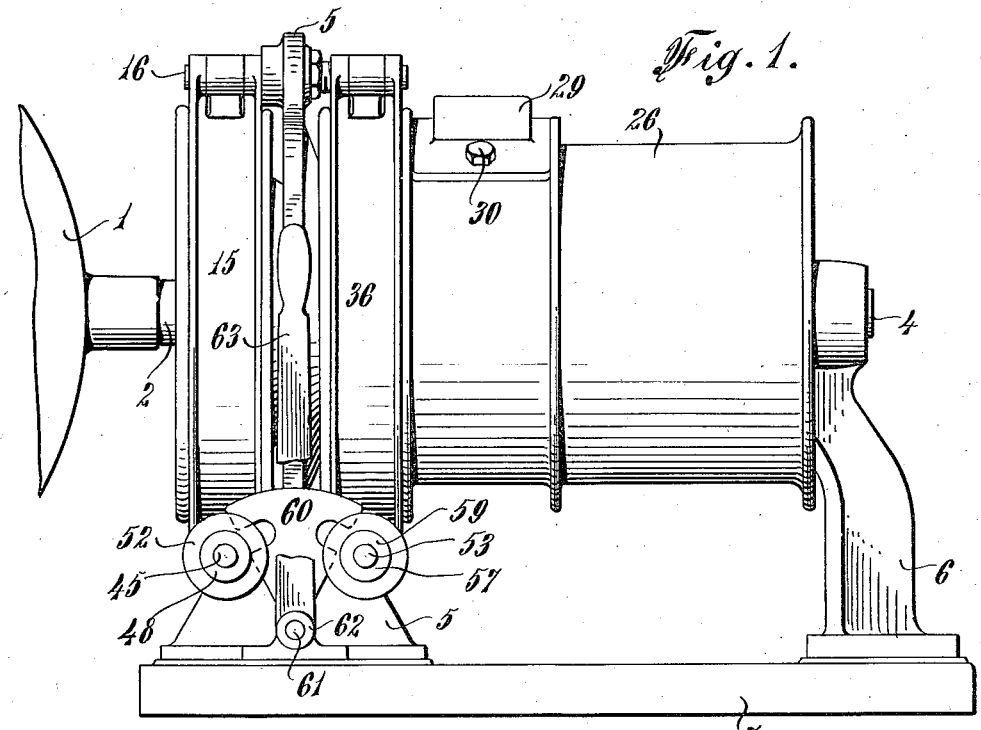
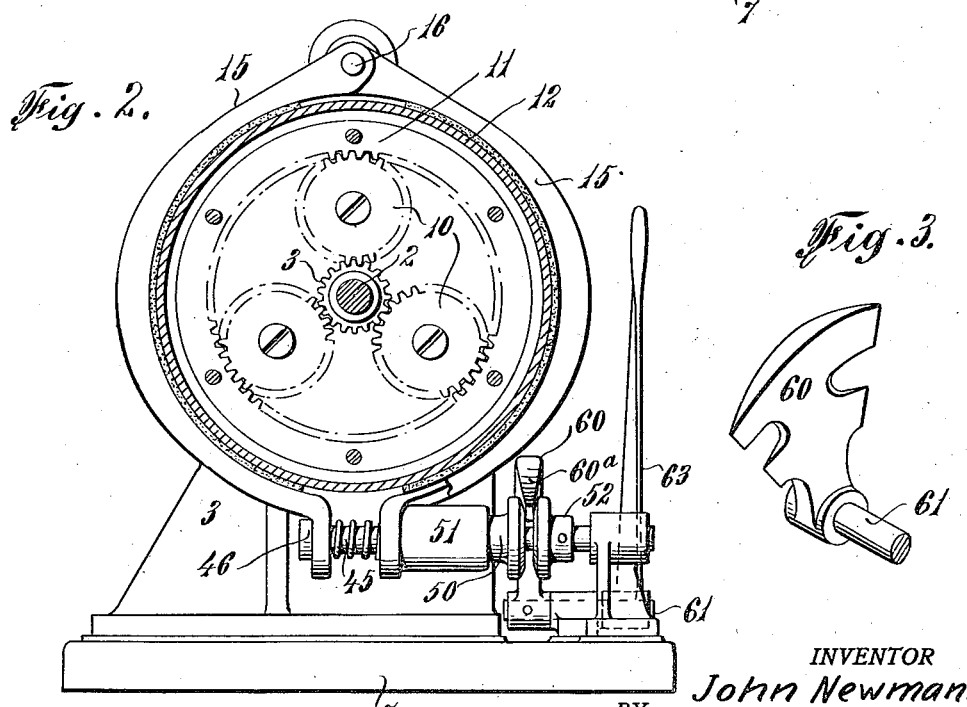
INVENTOR
John Newmann
BY
F. F. Bourne
ATTORNEY July 10, 1928.
J. NEWMANN
1,676,344
HOISTING APPARATUS
Filed Aug. 17, 1926
3 Sheets-Sheet 2
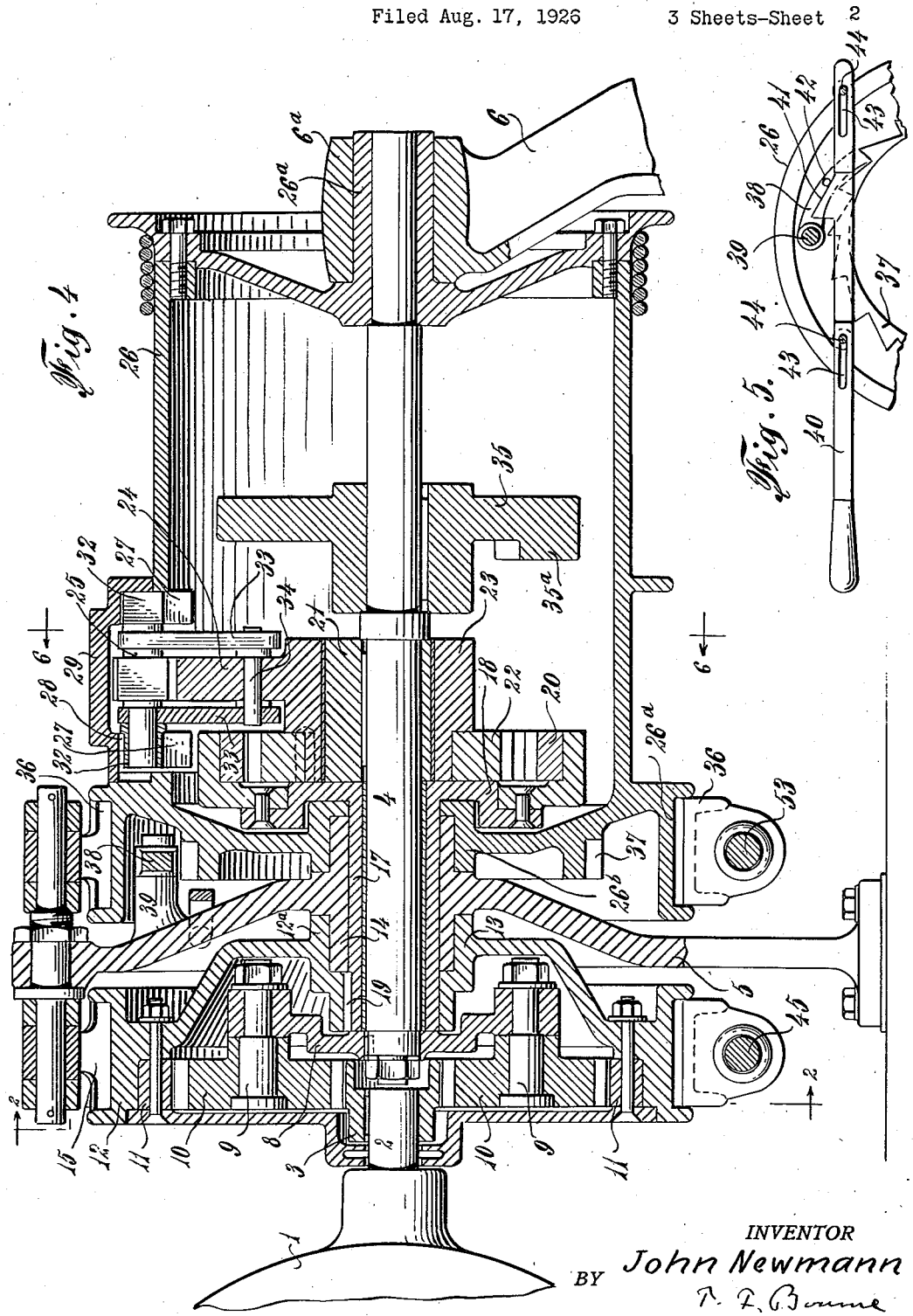
INVENTOR
John Newmann
BY
ATTORNEY

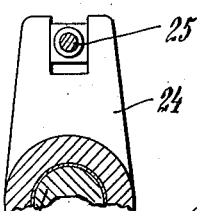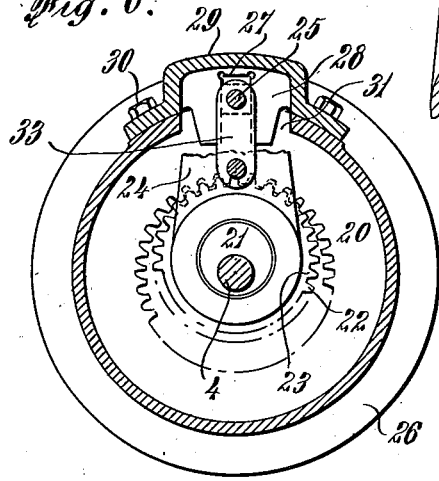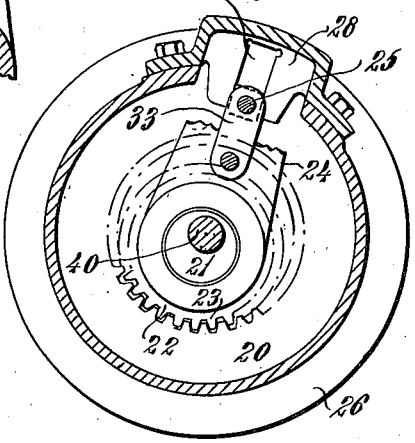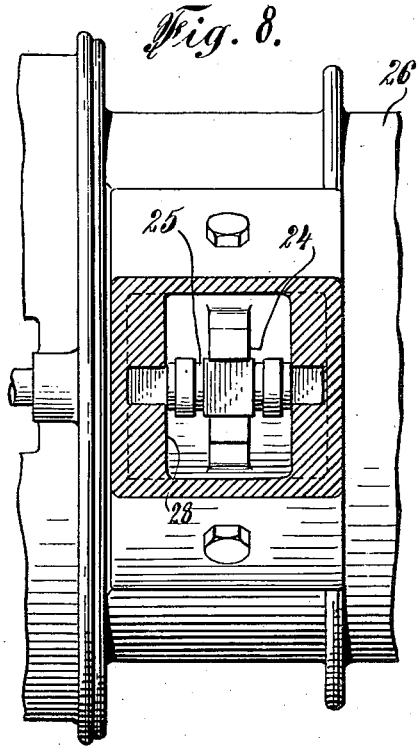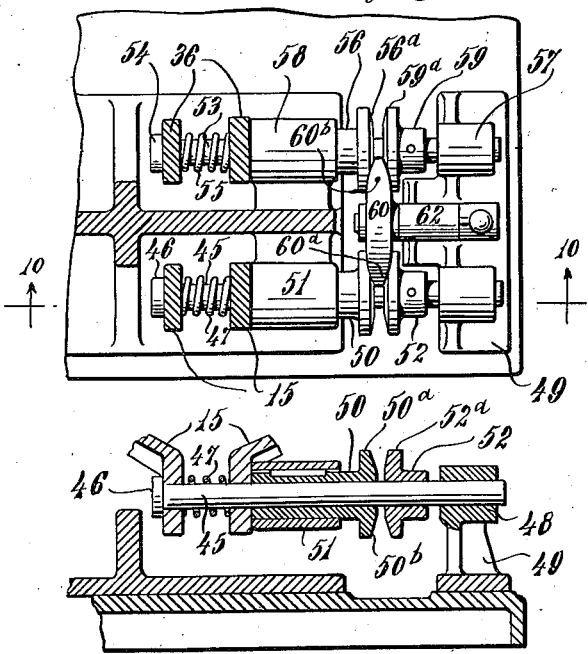

Patented July 10, 1928.

1,676,344

UNITED STATES PATENT OFFICE.

JOHN NEWMANN, OF GLENDALE, NEW YORK.

HOISTING APPARATUS.

Application filed August 17, 1926. Serial No. 129,784.

The object of my invention is to provide improved means for operating a driven member from a driving member at speed considerably reduced from the speed of a prime mover, such as a motor, and to be able to retard or brake rotation of the driven member at will.

In carrying out my invention I provide a planetary transmission gearing adapted to be driven from a source of power and provided with a shaft which is driven at reduced speed by said gearing, which shaft is provided with an eccentric adapted to operate a gear that is cooperative with another gear in an orbital path for rotation of the first named gear, the second named gear being connected with the internal gear of the planetary transmission, whereby both gears will be checked from rotation at the same time, said first named gear being connected with a drum for rotating the latter at speed reduced from the speed of the shaft derived from the planetary gearing, whereby the drum may be rotated through the double sets of gearing at speed greatly reduced from the speed of the driving power.

My invention further comprises novel details of improvement that will be more fully hereinafter set forth and then pointed out in the claims.

Reference is to be had to the accompanying drawings forming a part hereof, wherein Fig. 1 is a side elevation of a hoisting apparatus embodying my invention;

Fig. 2 is a cross section of Fig. 1;

Fig. 3 is a detail of a controlling member for the brake bands;

Fig. 4 is an enlarged longitudinal section through Fig. 1;

Fig. 5 is a detail of a back-stock device;

Figs. 6 and 7 are sectional views on line 6, 6, in Fig. 4, showing parts in different positions;

Fig. 7ª is a detail view;

Fig. 8 is a partly sectional plan view of a portion of Fig. 1;

Fig. 9 is a partly sectional plan view of the brake band controlling devices; and Fig. 10 is a section on line 10, 10, in Fig. 9.

Similar numerals of reference indicate corresponding parts in the several views.

The numeral 1 indicates a prime mover or power apparatus which may be any suitable motor having a driving shaft 2 that is provided with a driving pinion 3 of a planetary transmission gearing. At 4 is a driven shaft that is supported in suitable bearings in brackets or other suitable supports 5 and 6, which are shown carried by a base 7. The shaft 4 is secured to a spider or support 8 provided with gudgeons or pivots 9 on which intermediate pinions 10 are journaled concentrically with respect to shafts 2 and 4, which pinions are in mesh with pinion 3 and with an internal annular gear 11 secured to or formed with a drum 12 that is provided with a hub 13 shown journaled to rotate upon the hub portion 14 of bracket 5, (Fig. 4). A brake band 15 encircles the drum 12 and is shown made in two parts pivotally supported upon a pin 16 carried by bracket 5. The free ends of the brake band are to be drawn together for gripping the drum 12 and are to spread to release the drum. Means for the purpose will be explained hereinafter. The hub portion 12ª of drum 12 is secured to a hub 17 of a disk or spider 18, as by a key at 19. The disk or spider 18 is provided with an internal gear 20 which may be secured to or formed with said disk or spider, (Figs. 4, 6 and 7). The rotative parts set forth are all concentric with the shafts 2 and 4, the latter being axially disposed. The shaft 4 is provided with an eccentric 21, shown located at one side of the disk or spider 18, and at 22 is an external gear of smaller diameter than the internal gear 20, adapted to mesh therewith and to travel within the gear 20 in an orbital manner, the gear 22 being around the eccentric. The gear 22 is connected with a strap 23 mounted upon the eccentric 21, and for convenience of manufacture the gear 22 and the strap 23 may be made in separate pieces and secured together, or they may be made in a single piece. The strap 23 is provided with an outwardly or radially extending arm 24 that is provided with a pin 25 that extends from opposite sides of the arm, (Figs. 4 and 8), adapted to actuate a drum 26. The drum 26 is shown journaled concentric with respect to shaft 4 and provided with a hub 26ª journaled within the bearing 6ª of bracket 6, within which hub the adjacent end of shaft 4 is journaled, said drum also having a hub portion 26ᵇ journaled upon the hub portion 14 of bracket 5, (Fig. 4). A hoisting rope is adapted to be wound upon the drum 26. The arm 24 is reciprocated by and during the rotation of eccentric 21 and said arm is also caused to rotate by reason of the orbital travel of gear 22 within gear 20, and pin 25 is slidably cooperative with drum 26 to rotate the latter. Said drum is provided with guide ways 27 so that pin 25 may assume different radial positions respecting the drum, due to the rotation of eccentric 21. The guideways 27 are shown in the form of slots formed in metal pieces 28 that extend inwardly respecting the drum from a detachable cap 29, which may be secured upon the drum by means of screws 30, which cap closes an opening 31 in a side of the drum through which the arm 24 operates, (Figs. 6 and 7). The pin 25 at its ends is provided with anti-friction bushings operative in the slots 27. At 33 are links that are pivotally attached to arm 24 and located on opposite sides thereof, which links are connected with said arm by means of pin 34 extending through the arm, (Fig. 4). A balancing member 35 is secured on shaft 4 and has a relatively heavy or weighted portion 35$^a$ located diametrically with regard to the greater diameter of eccentric 21, (Fig. 4), and on the side of the shaft opposite the latter, serving to balance and equalize the rotations of said eccentric. The drum 26 is provided with an annular braking surface 26$^a$ adapted to be engaged by brake band or strap 36 which is substantially the same as described with respect to brake band 15, comprising two members journaled at their adjacent ends upon pin 16 and the free ends of the band are to be drawn together for gripping the drum portion 26$^a$ and are to spread to release the drum.

The drum 26 is shown provided with ratchet teeth 37, (Figs. 4 and 5), adapted to be engaged at will by dog 38 that is pivoted upon a pin 39 extending from the bracket 5 for retarding reverse rotation of the drum, (Figs. 4 and 5). As a convenient means for operating dog 38 I have illustrated a slidable bar 40 having an inclined surface 41 adapted to engage a pin 42 on said dog, which bar is provided with slots 43 receiving pins 44 that extend from bracket 5 for slidably supporting and guiding the bar. When the bar 40 is in the position shown in Fig. 5 dog 38 will engage a ratchet tooth 37 to retain drum 26 from reverse rotation under a load on the rope wound on the drum, and when the rod 40 is pushed to the right in Fig. 5 its surface 41 by engaging pin 42 will raise and retain dog 38 from the ratchet teeth 37 to permit drum 26 to be rotated.

In order to operate either of the brake bands 15 or 36 at will suitable means may be provided. I have illustrated the free ends of the brake band 15 provided with holes slidably receiving rod 45 that is provided with a head 46 at one end bearing against one member of the brake band, (Figs. 9 and 10), a spring 47 between the ends of the brake band members serving normally to spread them to release the drum 12. The rod 45 is slidably supported in a bearing 48 in bracket 49, and upon said rod is a slidable sleeve 50 supported in a bearing 51 carried by bracket 3. One end of sleeve 50 bears against a free end of one of the brake members 15 and at the opposite end is provided with a head 50$^a$, the outer surface of which is shown convex at 50$^b$. Spaced from the head 50$^a$ is a stop 52 that is secured upon rod 45 and is provided with a convex end surface 52$^a$ opposing and spaced from the surface 50$^b$ of sleeve 50. Parts corresponding to the foregoing are provided at the free ends of brake band 36, (Fig. 9), comprising a rod 53 having head 54, spring 55 interposed between the free ends of brake band, sleeve 56 having a convex face 56$^a$, the rod being journaled in bearing 57 and sleeve 56 being slidable in bearing 58, and a stop 59 secured upon rod 55 and having a convex face 59$^a$ spaced from the face 56$^a$ of sleeve 56. The sleeve 56 is adapted to bear against the free end of the adjacent brake member 36. A controlling member 60 is pivotally supported between the rods 45 and 53 to be rocked, which member is secured upon a shaft 61 journaled in a bearing 62, said shaft being provided with an operating handle or lever 63. The member 60 is provided with wedge-like edge portions on opposite sides at 60$^a$, 60$^b$, (Fig. 9), adapted to pass respectively between the stop 52 and sleeve 50 when member 30 is tilted by lever 63 to the left in Fig. 1. By forcing the member 60 between stop 52 and sleeve 50 the rod 45 will be pulled to the right and the sleeve 50 will be pushed to the left, as illustrated in Fig. 10, whereby the free ends of the brake band 15 will be drawn together for causing the brake band to grip the drum 12 to retard or stop the rotation of said drum. When the member 60 is shifted to the right in Fig. 1 it will be forced between the stop 59 and the sleeve 56. The rod 53 will be pulled to the right and the sleeve 56 will be slid to the left in Fig. 9 to cause the brake band members 36 to grip the surface 26$^a$ of drum 26 to retard or brake the latter. When the member 60 is in the neutral position shown in Fig. 1 neither brake band will be applied to its corresponding drum.

The operation may be described as follows:

When shaft 2 is rotated and drum 12 is held from rotation by brake band 15 the internal gears 11 and 20 will be held stationary. The rotation of shaft 2 causing rotation of pinion 3 will cause axial rotation of the pinions 10, which, in traveling within gear 11, will cause rotation of spider 8, thereby rotating shaft 4 and eccentric 21. The rotation of eccentric 21 within the gear 22 will cause the latter to travel within the gear 20 in an orbital or eccentric path around shaft 4, the gear 22 successively engaging teeth of the gear 20, and by reason of the movable connection of arm 24 with drum 26, by means of the slidable pin 25, said drum will be caused to rotate for winding up the rope thereon to raise or lower an object or perform other work. By reason of the planetary gearing shown, that is operated by motor 1, the speed of rotation of shaft 4 will be considerably reduced from the speed of rotation of shaft 2, say at the ratio of five to one reduction, and in accordance with the arrangement of eccentric 21 and the gearing 20 and 22, driven by the shaft 4, (the ratio of driving being a reduction of speed of ten to one from shaft 4 to drum 26), said drum will be driven at a speed reduced from the speed of shaft 2 at the ratio of fifty to one. When the apparatus is used for hoisting by means of the rope it will simply be necessary to swing the lever 63 to the left in Fig. 1 to cause operation of the gearing, and when the load has been lifted to the desired height said lever may be swung to the right to cause the brake band 36 to grip and retard or retain the drum 26. The weight may be lowered by relieving the pressure of the brake band 36 on drum surface 26ª allowing slippage. If it be desired to retain the weight in an elevated position rod 40 will be operated to cause dog 38 to engage a ratchet tooth 37, which dog will be released from the tooth when desired to further operate the drum 26 in either direction.

My improvement is simple in construction, direct in operation in that the parts are compact and rotative in an axial relation, providing for a great reduction in speed of rotation of the drum 26 derived from a relatively high speed power source, whereby the lifting power of the drum is large, and the apparatus is cheap to manufacture and not liable to get out of order. The apparatus may be used for purposes other than hoisting.

Having now described my invention what I claim is:—

1. An apparatus of the character set forth comprising a planetary transmission mechanism having a drive pinion, an internal gear, an intermediate pinion, a driven shaft connected with the intermediate pinion and brake means for said internal gear, an eccentric operative by said shaft, a gear operative by said eccentric, a third gear cooperative with the last named gear, said brake means retarding rotation of the third named gear, a drum, and means cooperative with the second named gear and the drum for rotating it.

2. An apparatus as set forth in claim 1, in which the third named gear is connected with said gear of the planetary mechanism whereby both gears will be simultaneously retarded for causing rotation of the drum.

3. An apparatus of the character set forth comprising a planetary transmission mechanism having a drive pinion, an internal gear, an intermediate pinion, a driven shaft connected with the intermediate pinion and brake means for said internal gear, an eccentric operative by said shaft, a gear operative by said eccentric, a third gear cooperative with the last named gear, said brake means retarding rotation of the third named gear, a strap operative by the second named gear and having an arm, a drum, and means providing movable connection between the arm and the drum for rotating the latter by the former.

4. An apparatus of the character set forth comprising a planetary transmission mechanism having a driven shaft and brake means for a gear thereof, an eccentric on said shaft, a gear on said shaft and a radially disposed arm connected to said gear, a third gear with which the last named gear meshes in an orbital path, means connecting the third gear with the first named gear for retardation therewith, a drum, and means operatively connecting said arm with the drum for rotating the latter.

5. An apparatus as set forth in claim 4, in which the arm is provided with a pin and the drum is provided with a guideway slidably receiving the pin for rotating the drum.

6. An apparatus of the character set forth comprising a planetary transmission mechanism having an internal gear provided with a braking surface, brake means therefor, and a driven shaft, a gear connected with the internal gear and concentric with said shaft, an eccentric on said shaft, a gear on the eccentric and meshing with the second gear in an orbital path, a drum concentric with said shaft, and means operatively connecting the third named gear with the drum for rotating the latter.

7. An apparatus as set forth in claim 6, in which the means connecting the third named gear with the drum include an arm connected with said gear and slidably connected with the drum for rotating the latter.

JOHN NEWMANN.